United States Patent
Henderson et al.

(10) Patent No.: US 6,907,118 B2
(45) Date of Patent: Jun. 14, 2005

(54) METHOD AND SYSTEM FOR FACILITATING CALL-RELATED ACTIVITIES

(75) Inventors: Donnie Henderson, Manalapan, NJ (US); David Millen, Fair Haven, NJ (US)

(73) Assignee: AT&T Corp., New York, NY (US)

( * ) Notice: Subject to any disclaimer, the term of this patent is extended or adjusted under 35 U.S.C. 154(b) by 569 days.

(21) Appl. No.: 09/782,097

(22) Filed: Feb. 13, 2001

(65) Prior Publication Data

US 2002/0110233 A1 Aug. 15, 2002

(51) Int. Cl.[7] ............................................... H04M 3/42
(52) U.S. Cl. ............................. 379/214.01; 379/215.01
(58) Field of Search .......................... 379/88.17, 88.19, 379/88.2, 207.14, 207.15, 210.01, 214.01, 215.01, 218.01, 265.09

(56) References Cited

U.S. PATENT DOCUMENTS

| | | | | |
|---|---|---|---|---|
| 5,850,433 A | * | 12/1998 | Rondeau | 379/218.01 |
| 6,130,933 A | * | 10/2000 | Miloslavsky | 379/90.01 |
| 6,438,599 B1 | * | 8/2002 | Chack | 709/229 |
| 6,493,447 B1 | * | 12/2002 | Goss et al. | 379/265.09 |

* cited by examiner

*Primary Examiner*—Bing Q. Bui

(57) ABSTRACT

A method is disclosed for facilitating a call related to a computer activity. The disclosed method includes associating a computer activity with a call activity. That method also includes anticipating the call activity based on a performance of the computer activity, and providing, via a user-computer interface, a call activity trigger associated with the anticipated call activity.

31 Claims, 6 Drawing Sheets

METHOD AND SYSTEM FOR FACILITATING CALL-RELATED ACTIVITIES

FIELD OF THE INVENTION

The present invention relates to the field of telecommunications, and, more particularly, to a method and system for facilitating call-related activities.

BACKGROUND

Before, during, and/or after using the telephone, computer users often access computerized information of various kinds. In particular, users frequently look for information that may be relevant to the conversation, such as for example, scheduling information in computerized calendars, telephone or fax numbers in databases or on-line directories, and/or electronic documents. For instance, secretaries have reported that they frequently answer calls from their boss when that boss is away from the office, and are asked to look-up someone's telephone number in the office and/or corporate directory. Moreover, those same secretaries sometimes call a person after looking-up that person's telephone number in an on-line directory.

Currently, there is no method for associating telephone calls with the information accessed by a computer user in response to, during, and/or anticipation of, those calls, such that the information can be made available to the user before, during, and/or after the user participates in the call.

Also, there is no method for associating with a call those activities of a computer user that occurred prior to making the call, such that the call can be automatically suggested and/or placed upon performance of the activities by the user.

SUMMARY OF THE INVENTION

A method is disclosed for facilitating a user activity related to a call. The disclosed method includes associating a user activity with a call activity having a call identifier. The disclosed method also includes transacting a call having the call identifier, and providing, via a user-computer interface, a user activity trigger associated with the call identifier.

Another method is disclosed for facilitating a call related to a computer activity. The disclosed method includes associating a computer activity with a call activity. That method also includes anticipating the call activity based on a performance of the computer activity, and providing, via a user-computer interface, a call activity trigger associated with the anticipated call activity.

BRIEF DESCRIPTION OF THE DRAWINGS

The invention will be more readily understood through the following detailed description, with reference to the accompanying drawings, in which.

DETAILED DESCRIPTION

Overview

Embodiments of the present invention include various methods for facilitating a user activity related to a call and/or facilitating a call related to a user activity. At least one method includes associating a user activity with a call activity having a call identifier. That method also includes transacting a call having the call identifier, and providing, via a user-computer interface, a user activity trigger associated with the call identifier.

Another method includes identifying a first occurrence of a computer activity involving a user and identifying a first occurrence of a call activity associated with a call identifier and involving the user. The method further includes associating the computer activity with the call activity; recognizing a second occurrence of the call activity; anticipating a second occurrence of the computer activity based on the second occurrence of the call activity; providing, via a user-computer interface, a computer activity trigger associated with the anticipated computer activity; and initiating the second occurrence of the computer activity in response to a selection of the computer activity trigger.

Yet another method includes associating a computer activity with a call activity. That method also includes anticipating the call activity based on a performance of the computer activity, and providing, via a user-computer interface, a call activity trigger associated with the anticipated call activity.

Still another method includes identifying a first occurrence computer activity involving a user; identifying a first occurrence of a call activity associated with a call identifier and involving the user; associating the computer activity with the call activity; recognizing a second performance of the computer activity involving the user; anticipating a second occurrence of the call activity based on the second performance of the computer activity; providing, via a user-computer interface, a call activity trigger associated with the anticipated call activity; and placing, for the user, a call having the call identifier in response to a selection of the call activity trigger.

Method 100

Figure 1:
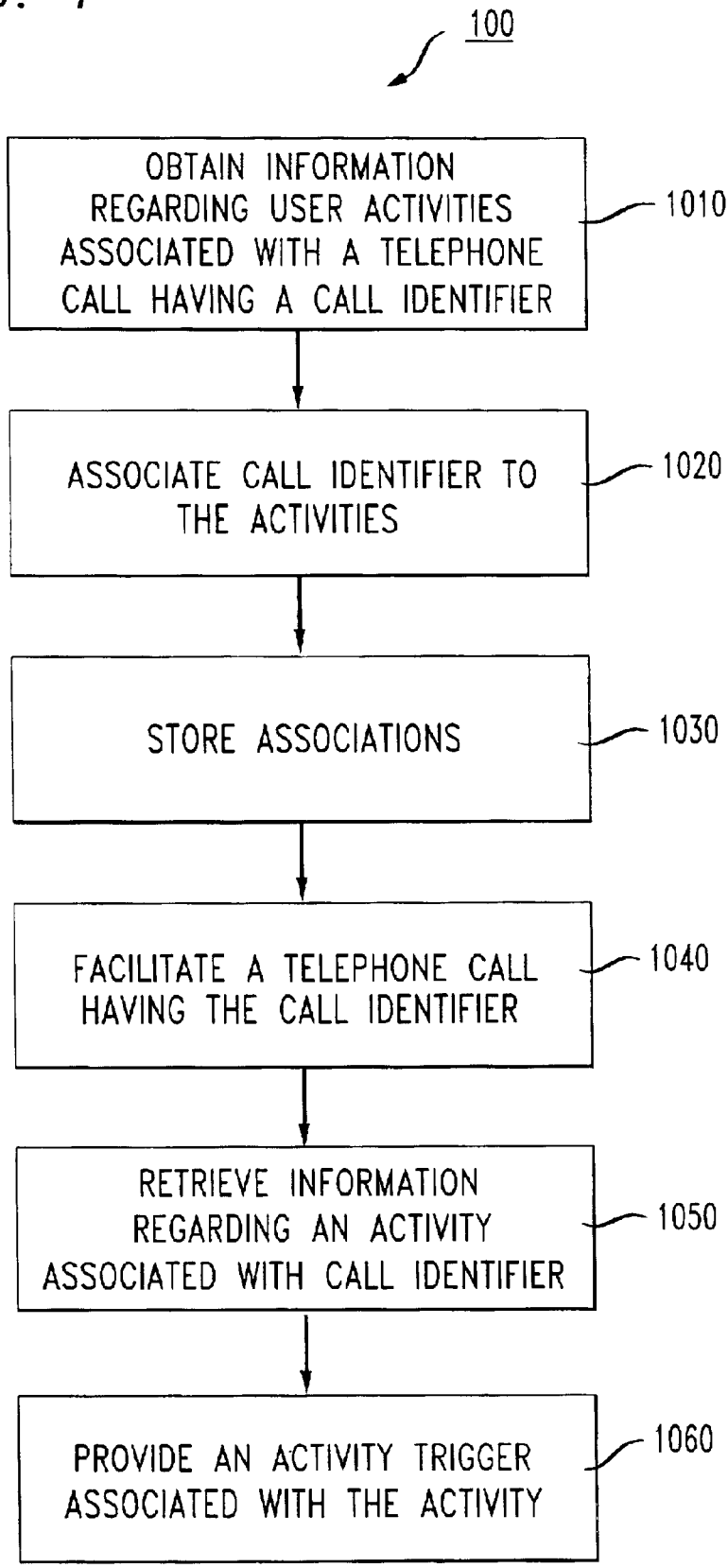
FIG. 1 is a flowchart of an embodiment of a method 100 of the present invention.

FIG. 1 is a flowchart of an embodiment of a method 100 of the present invention. Method 100 can begin at action 1010 by obtaining information regarding user activities associated with a telephone call. The user activities can include a wide range of activities, including, for example:

- operating a computer program;
- running a computer program;
- accessing a computer program;
- accessing a web page;
- initiating an e-mail message;
- generating an e-mail message;
- sending an e-mail message;
- accessing a schedule;
- accessing a database;
- searching a database;
- accessing a document;
- transforming a document; and/or
- generating a document.

The telephone call can have a call identifier, such as, for example, a telephone number, ANI, DNIS, name, and/or location of the calling party and/or the called party. By way of further example, if the call is incoming to the user, the call identifier can include the ANI of the calling party, and if the call is outgoing from the user, the call identifier can include the DNIS of the called party.

The call identifier can be logged when calls are placed to and/or from the user. Also, the user activities can be logged when engaged in by the user.

At action 1020, the call identifier can be associated with the user activities, particularly those user activities that occur in relation to the call. For example, if upon receiving a call from a supervisor, a secretary frequently accesses a personnel directory, then that activity can be associated with the telephone number, ANI, and/or name of the supervisor. As another example, if before calling a particular client a salesperson frequently accesses a database containing the client's account information, opens the client's web site, and searches the web for recent press releases relating to the client, then those activities can be associated with the client's telephone number, DNIS, organization, and/or name.

The association between the activities and the call identifier can be formed manually and/or automatically. Moreover, the activities and calls can be statistically analyzed to determine the frequently occuring calls, the frequently occuring activities, and/or those calls that are likely to consistently generate particular activities.

At action 1030, information regarding the associations between the activities and the call identifier can be stored in a database for later retrieval. Referring to the earlier salesperson example, the database can store a record relating the DNIS of the client to codes describing the activities of accessing a database containing the client's account information, opening the client's web site, and searching the web for recent press releases relating to the client. As will be explained further below, the database can also and/or alternatively store a record relating the DNIS of the client to executable and/or interpretable computer instructions for accessing a database containing the client's account information, opening the client's web site, and searching the web for recent press releases relating to the client.

At action 1040, a telephone call having the call identifier can be facilitated. For example, an incoming telephone call can be transmitted to the called user, or an outgoing telephone call can be transmitted from the calling user.

At action 1050, the call identifier of the facilitated call can be used to retrieve from the database the information regarding the associations between the user activities and the call identifier.

At action 1060, the information regarding the associations between the activities and the call identifier can be used to create and/or render (i.e., make perceptible) activity triggers associated with the activities. Activity triggers can include user interface elements such as menu items, buttons, icons, and/or linked text. The activation of an activity trigger can cause computer instructions, such as a script, macro, and/or hyperlink, etc. to execute and/or be interpreted. These computer instructions can facilitate performance of the activity.

Consider the earlier salesperson example. When the particular client is called, a computer screen of the salesperson can be provided with activity triggers for accessing a database containing the client's account information, opening the client's web site, and searching the web for press releases relating to the client. Clicking on the activity trigger for opening the client's web site can launch the salesperson's browser if not already running, or make that browser the foreground application if already running. Then, the URL of the client's web site can be automatically entered (and re-entered if a timeout and/or error occurs), so that the client's web site appears on the salesperson's browser. Alternatively, while rendering the activity trigger for accessing the client's web site, the method can access a window of the salesperson's browser and enter the client's URL, but keep and/or move that browser window to the background, only bringing it to the foreground when the particular client website activity trigger is executed.

System 200

Figure 2:
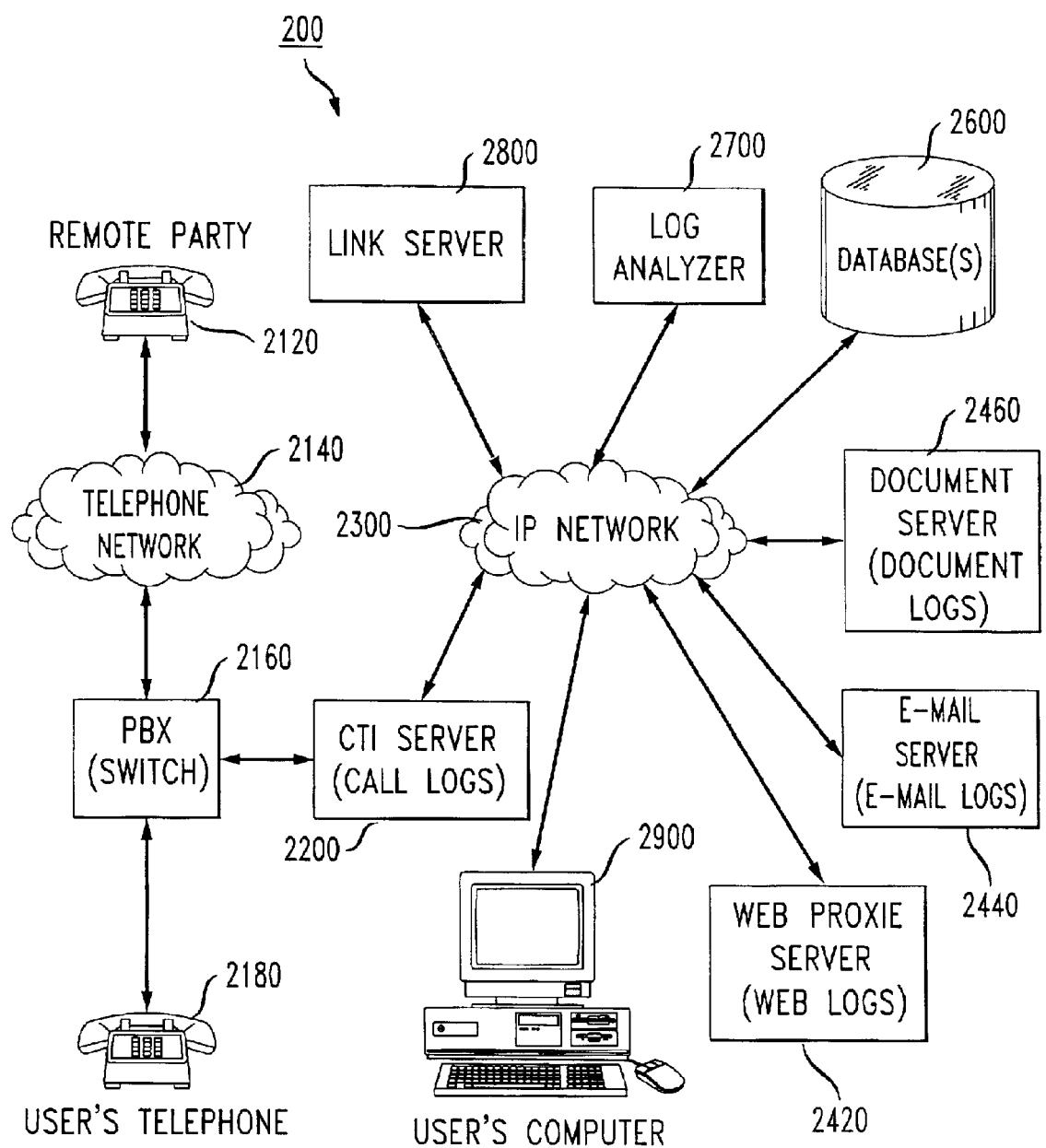
FIG. 2 is a block diagram of an embodiment of a system 200 of the present invention.

FIG. 2 is a block diagram of an embodiment of a system 200 of the present invention. As an initial matter, it suffices to say that, using the description of method 100 and/or method 500 (described below), one of ordinary skill in the art can implement the functionality of method 100 and/or method 500 via system 200 utilizing any of a wide variety of well-known architectures, hardware, protocols, and software. Thus, the following description of system 200 can be viewed as illustrative, and should not be construed to limit the implementation of method 100 and/or 500.

Within system 200, a remote communication device 2120, such as a telephone, can place and/or receive calls via a communication network 2140, such as a telephone network. Those calls can be routed from and/or to communication network 2140 through a local switch 2160, such as a PBX, from and/or to a user's information device 2180, such as a telephone.

A computer-telephony interface (CTI) server 2200 attached to local switch 2160, can log calls routed through local switch 2160, and make the resulting call logs available for access via communication network 2300, such as an IP network.

Also attached to communication network 2300 can be various other servers, such as, for example, Web proxie server 2420, which can log web pages accessed by a user's information device 2900, such as a computer. As a further example, an e-mail server 2440 can be attached to communication network 2300 and can log e-mail messages sent and/or received by the user's information device 2900. As another example, a document server 2460 can be attached to communication network 2300 and can log documents created, edited, printed, and/or accessed by the user's information device 2900. As still another example, a database server (not shown) can be attached to communication network 2300 and can log accesses, searches, and/or results associated with information databases served by the database server. Such logs can capture, for example, an identity of the user performing the database accesses and/or searches and/or an identity of the user's information device 2900.

Also attached to communication network 2300 can be one or more system databases 2600, which can be useful for storing logs, associations between call identifiers and activities, and/or information regarding associations between call identifiers and activities. A log analyzer 2700 attached to communication network 2300 can statistically analyze the logs to identify likely associations between between call identifiers and activities.

A link server 2800 attached to communication network 2300 can create activity triggers and/or computer instructions, which can be stored in one or more databases 2600.

In one embodiment of system 200, upon arrival of a call having a call identifier at CTI server 2200, link server 2800 can look-up the call identifier in database 2600, to find any associated information, including call activities, activity triggers, and/or activity computer instructions. If the call identifier is found, link server 2800 can render associated activity triggers on user's computer 2900. Selection of those activity triggers can cause execution and/or interpretation of activity computer instructions, which can facilitate the user activity.

In another embodiment of system 200, upon recognition of one or more user activities, link server 2800 can look-up the activities, and/or codes identifying the activities, in database 2600, to find any associated information, including call identifiers, call triggers, and/or call computer instructions. If the activity codes are found, link server 2800 can render associated call triggers on user's computer 2900. Selection of those call triggers can cause execution and/or interpretation of call instructions, which can facilitate the placement of the associated call.

Networks 2140 and/or 2300 can have any architecture, including a direct connection, a local area network, a wide area network, a public switched telephone network, the Internet, an intranet, an extranet, a virtual private network, etc., and/or a combination thereof. Networks 2140 and/or 2300 can be a packet-switched, a circuit-switched, a connectionless, or connection-oriented network or interconnected networks, or any combination thereof. Moreover, a transmission media of networks 2140 and/or 2300 can take any form, including wireline, satellite, wireless, or any combination thereof. In certain embodiments, the transmission media of networks 2140 and/or 2300 can be limited to those that support the secure transmission of data.

From a hardware standpoint, any information device 2180, 2900 can be, for example, a landline or wireless telephone, facsimile, personal computer, workstation, personal information manager, personal digital assistant, handheld computer, data terminal, or other similar device. Similarly, server 2200, 2420, 2440, 2460, 2800, and/or any analyzer 2700 can be, for example, a landline or wireless telephone, facsimile, personal computer, workstation, minicomputer, mainframe computer, personal information manager, personal digital assistant, handheld computer, data terminal, or other similar device.

The databases of system 200 can have a flat file or a relational organization, and a centralized or distributed architecture. For instance, those of skill in the art can tailor products such as an SQL database to provide at least some of the functionality of method 100 and system 200. One supplier of such database products is Oracle Corporation, of Redwood Shores, Calif.

Software standards and protocols such as EDI, FTP, HTTP, SGML, HTML, XML, cXML, XSL, SSL, WML, WAP and/or Bluetooth, etc., can be utilized for at least some communications within system 200. Additionally, system 200 can utilize platform-independent and/or network-centric software tools such as, for example, CGI, Java, and/or JavaScript, etc., as well as tools such as VisualBasic, C, C+, C++, etc.

Device 300

Figure 3:
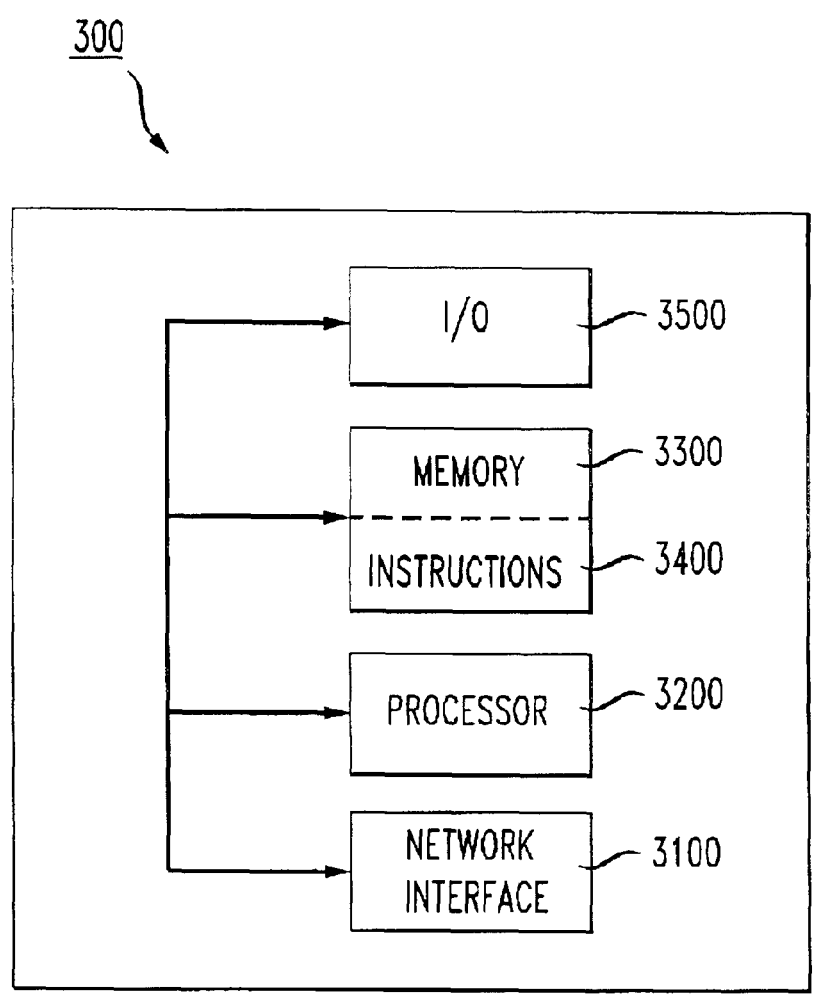
FIG. 3 is a block diagram of an embodiment of an information device 300 of the present invention.

FIG. 3 is a block diagram of a typical information device 300, which can symbolize any information device 2180, 2900, server 2200, 2420, 2440, 2460, 2800, and/or analyzer 2700. Information device 300 can include well-known components such as one or more network interfaces 3100, one or more processors 3200, one or more memories 3300 containing instructions 3400, and/or one or more input/output ("I/O") devices 3500.

In one embodiment, network interface 3100 can be a telephone, a traditional data modem, a fax modem, a cable modem, a digital subscriber line interface, a bridge, a hub, a router, or other similar devices.

In one embodiment, processor 3200 can be a general-purpose microprocessor, such the Pentium series microprocessor manufactured by the Intel Corporation of Santa Clara, Calif. In another embodiment, the processor can be an Application Specific Integrated Circuit (ASIC), which has been designed to implement in its hardware and/or firmware at least a part of a method in accordance with an embodiment of the present invention.

In one embodiment, memory 3300 can be coupled to a processor 3200 and can store instructions 3400 adapted to be executed by processor 3200 according to one or more actions of method 100. Memory 3300 can be any device capable of storing analog or digital information, such as a hard disk, Random Access Memory (RAM), Read Only Memory (ROM), flash memory, a compact disk, a magnetic tape, a floppy disk, etc., and any combination thereof.

In one embodiment, instructions 3400 can be embodied in software, which can take any of numerous forms that are well known in the art. In one embodiment, I/O device 3500 can be an audio and/or visual device, including, for example, a monitor, display, keyboard, keypad, touch-pad, pointing device, microphone, speaker, video camera, camera, scanner, and/or printer, etc., and can include a port to which an I/O device can be attached, connected, and/or coupled.

User Interface 400

Figure 4:
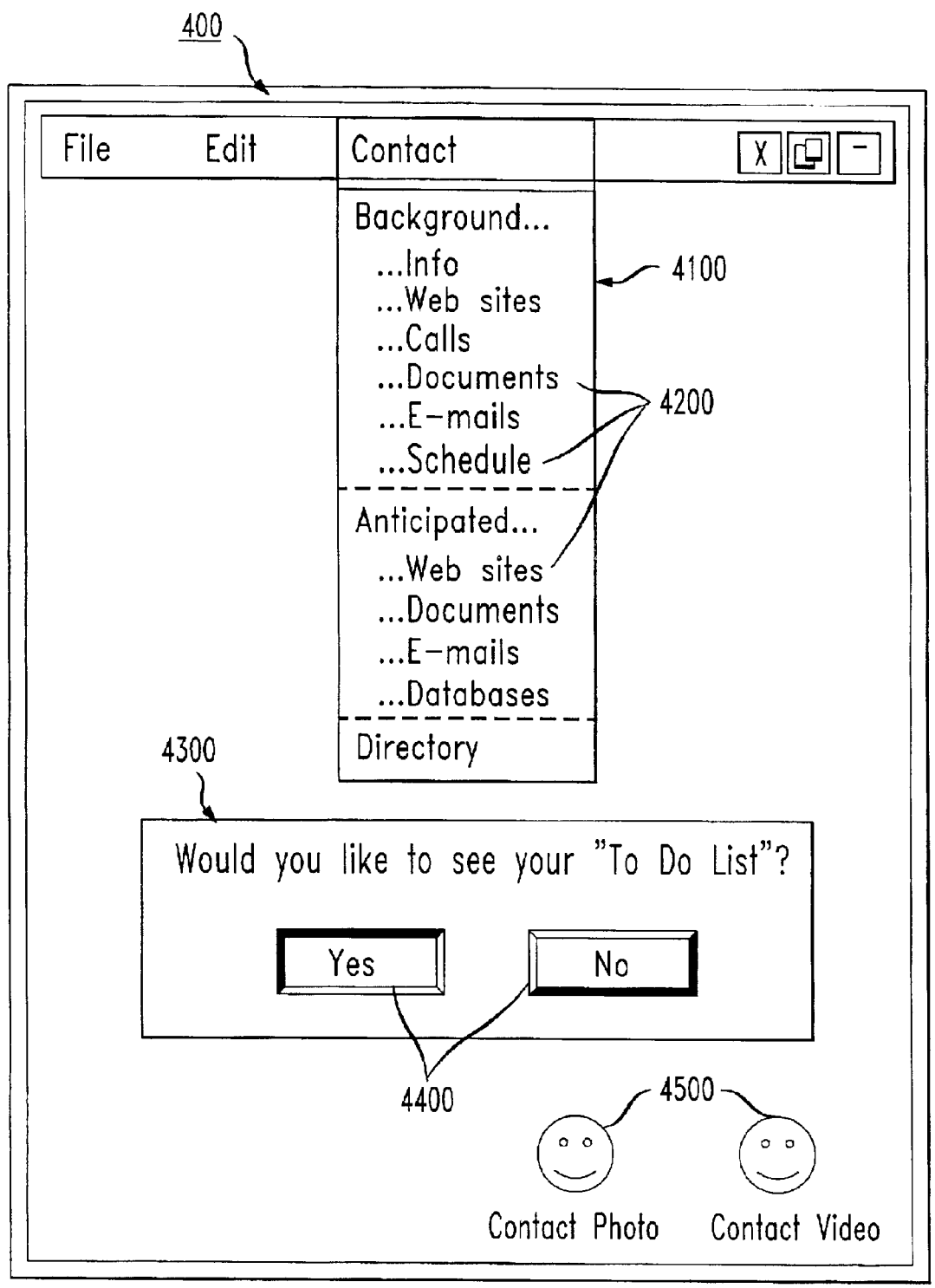
FIG. 4 is a diagram of an embodiment of a user interface 400 of the present invention.

FIG. 4 is a diagram of an embodiment of a user interface 400 of the present invention. User interface 400 can contain and/or render textual, graphical, photographic, animated, audio, and/or videographic elements. For example, user interface 400 can contain graphical user interface elements such as menus 4100, menu items 4200, dialog boxes 4300, buttons 4400, icons 4500, and/or hyperlinked text (not shown). Any user interface element can be selectable by the user, can serve as an activity trigger, and can cause the execution and/or interpretation of computer instructions that can facilitate a user activity and/or provide anticipated information.

As shown, menu items 4200 can be rendered that provide background information for a caller and/or callee ("contact"). The background information linked to menu items 4200 can include, for example, information regarding the contact, such as name, telephone number, fax number, pager number, mobile number, e-mail address, URL, title, mailing address, home address, birthday, significant other, etc. The background information can also include, for example, the contact's web site, a log of calls from the contact, documents provided by and/or for the contact, e-mail messages sent to and/or from the contact, and/or the contact's schedule, etc.

As also shown, menu items 4200 can be rendered that provide other information anticipated to be needed for a call with the contact. The anticipated information linked to menu items 4200 can include, for example, web sites, documents, e-mail messages, and/or databases, etc., frequently accessed when communicating with this contact.

Further, as shown, menu items 4200 can be rendered that provide access to, for example, an internal and/or external directory, search engines, and/or schedules, etc.

In an illustrative example, selecting the menu item 4200 labeled "Background Web Sites" can cause instructions to be followed that can cause the rendering on the user's computer monitor of a web site associated with the caller for an incoming call, the callee for an outgoing call, or all parties (other than perhaps the user) for a conference call.

Similarly, selecting the icon 4500 labeled "Contact Photo" on FIG. 4 can cause instructions to be followed that can cause the rendering on the user's computer monitor of a photograph of the caller for an incoming call, the callee for an outgoing call, or all parties (other than perhaps the user) for a conference call.

As another example, instead of organizing the anticipated information as menu items, buttons, and/or icons, etc., the activity triggers and/or anticipated information can be provided as a hyperlinked textual list.

Exemplary Utilization

We now turn to an exemplary utilization of an embodiment of the invention involving a commercial alarm system. Upon receipt of a call from an alarm system installed at a facility of a commercial client, an embodiment of a system of the present invention installed at a security services company can be activated.

Activation can begin upon recognition of the commercial client's call identifier and/or the typical activities associated with that call identifier. This recognition can cause a company employee to be provided with a user interface that, either directly and/or via activity triggers, identifies the client, renders a map to the client's facility and a diagram of that facility, and connects to an alarm server servicing that facility. The alarm server can be accessed to provide the system with information sufficient to enhance the user interface by providing, either directly and/or via activity triggers, an identity of a security device that tripped the alarm, and a live feed from a video camera focused on the vicinity of the security device, such as a door, window, and/or hallway.

Moreover, recognition of the client's call identifier and/or the typical activities associated with that call identifier can provide the company employee with a user interface that, either directly and/or via activity triggers, provides a document containing a written checklist to follow upon receipt of an alarm for the particular client, contact information for designated client personnel, and/or other information relevant to the particular alarm call.

Method 500

Figure 5:
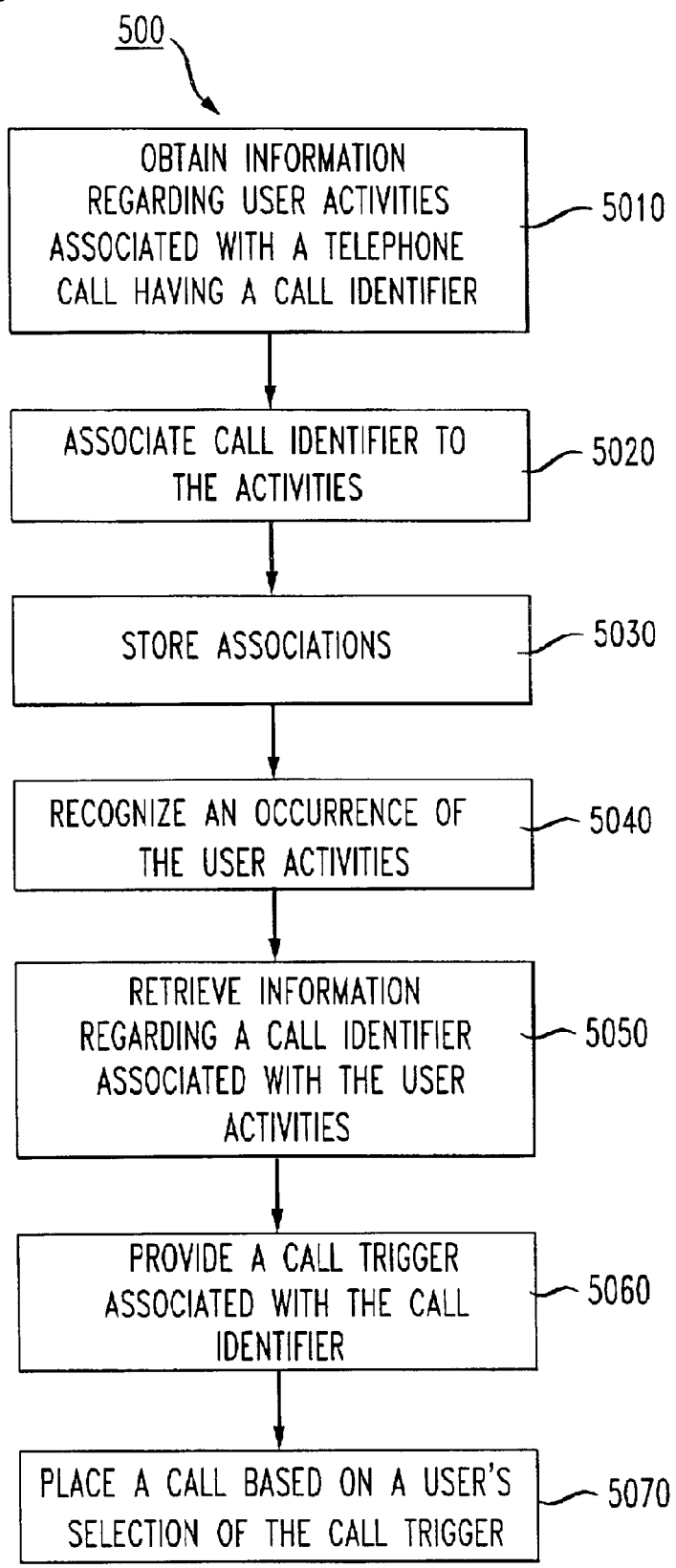
FIG. 5 is a flowchart of an embodiment of a method 500 of the present invention.

FIG. 5 is a flowchart of an embodiment of a method 500 of the present invention. Method 500 can begin at action 5010 by obtaining information regarding user activities associated with a telephone call. The user activities can include a wide range of activities, including, for example:

operating a computer program;

running a computer program;

accessing a computer program;

accessing a web page;

initiating an e-mail message;

generating an e-mail message;

sending an e-mail message;

accessing a schedule;

accessing a database;

searching a database;

accessing a document; and/or generating a document.

The telephone call can have a call identifier, such as, for example, a telephone number, ANI, DNIS, name, and/or location of the calling party and/or the called party. By way of further example, if the call is incoming to the user, the call identifier can include the ANI of the calling party, and if the call is outgoing from the user, the call identifier can include the DNIS of the called party.

The call identifier can be logged when calls are placed to and/or from the user. Also, the user activities can be logged when engaged in by the user.

At action 5020, the call identifier can be associated with the user activities, particularly those user activities that occur in relation to the call. For example, if prior to placing a call to a given person, a secretary frequently accesses one or more documents created by that person, then that activity can be associated with the telephone number, ANI, and/or name of the called person. As another example, if before calling a particular client a salesperson frequently accesses a database containing the client's account information, opens the client's web site, and searches the web for recent press releases relating to the client, then those activities can be associated with the client's telephone number, DNIS, organization, and/or name.

The association between the activities and the call identifier can be formed manually and/or automatically. Moreover, the activities and calls can be statistically analyzed to determine the frequently occuring calls, the frequently occuring activities, those calls that are likely to generate particular activities, and/or those activities that are likely to generate particular calls.

At action 5030, information regarding the associations between the activities and the call identifier can be stored in a database for later retrieval. Referring to the earlier salesperson example, the database can store a record relating the DNIS of the client to activity codes describing the activities of accessing a database containing the client's account information, opening the client's web site, and searching the web for recent press releases relating to the client. As will be explained further below, the database can also and/or alternatively store one or more records relating the activity codes to the DNIS of the client to executable and/or interpretable computer instructions for rendering a call trigger than can be selected to dial the DNIS of the client.

At action 5040, the user's performance of the activities can be recognized. Using the earlier example, the activities of accessing a database containing the client's account information, opening the client's web site, and searching the web for recent press releases relating to the client can be recognized.

At action 5050, the activity codes of the recognized user activities can be used to retrieve from the database information regarding a call identifier associated with the user activities.

At action 5060, the information regarding the call identifier can be used to create and/or render (i.e., make perceptible) at least one call trigger associated with the call identifier. Call triggers can include user interface elements such as menu items, buttons, icons, and/or linked text. The activation of a call trigger can cause computer instructions, such as a script, macro, and/or hyperlink, etc. to execute and/or be interpreted. These computer instructions can, for example, facilitate dialing of the telephone number and/or DNIS associated with the call identifier.

Consider the earlier salesperson example. When it is recognized that the salesperson has accessed a database containing a particular client's account information, opened the client's web site, and searched the web for recent press releases relating to the client, activity codes corresponding to these activities can be looked-up in a database to determine the telephone number of the client and/or a call trigger associated with the client. A computer screen of the salesperson can be provided with at least one call trigger associated with the client and/or the client's call identifier. Clicking on a call trigger can cause a click-to-dial routine to execute and/or be interpreted, thereby causing placement of a call to the telephone number or DNIS of the client.

User Interface 600

Figure 6:
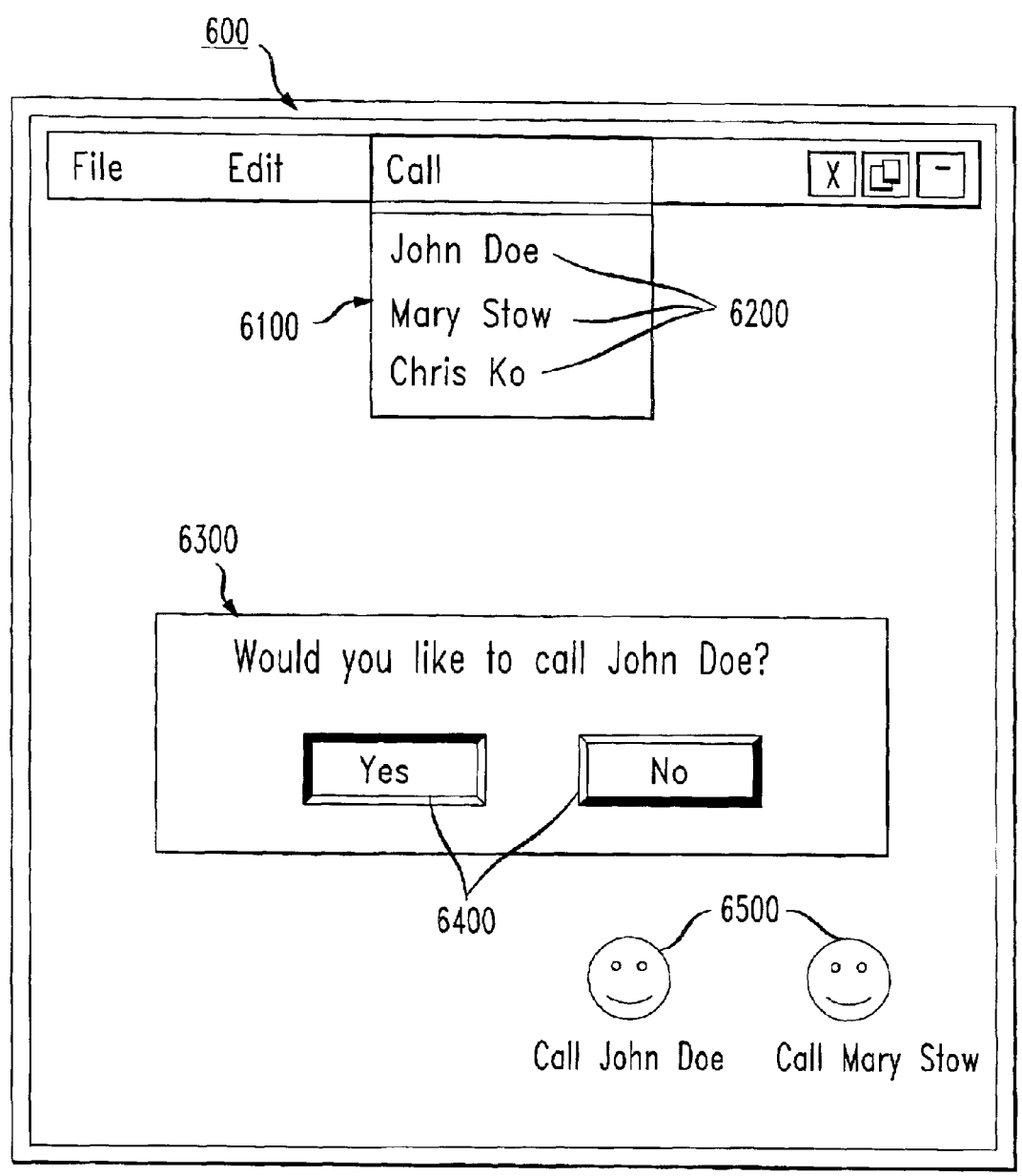
FIG. 6 is a diagram of an embodiment of a user interface 600 of the present invention.

FIG. 6 is a diagram of an embodiment of a user interface 600 of the present invention. User interface 600 can contain and/or render textual, graphical, photographic, animated, audio, and/or videographic elements. For example, user interface 600 can contain graphical user interface elements such as menus 4100, menu items 6200, dialog boxes 6300, buttons 6400, icons 6500, and/or hyperlinked text (not shown). Any user interface element can be selectable by the user, can serve as a call trigger, and can cause the execution and/or interpretation of computer instructions that can facilitate placing a call.

As shown, menu items 6200 can be rendered that provide the names of potential callee's. Attached to and/or associated with each of menu items 6200 can be the call identifier, such as for example, the telephone number and/or DNIS of the callee. The listed callee's can automatically change as changes in the user's 30 computer activities provoke look-ups that result in different call identifiers.

Alternatively, or in addition to menu items 6200, a dialog box 6300 can be rendered that asks whether the user desires that a call be placed to John Doe, whereby clicking on button 6400 titled "Yes" causes that call to be dialed. As another alternative, selecting the icon 4500 labeled "Call John Doe" on FIG. 4 can cause instructions to be followed that can cause a call to be placed to the DNIS associated with John Doe.

As another example, instead of organizing the anticipated information as menu items, buttons, and/or icons, etc., the call triggers can be automatically provided as a hyperlinked alphanumeric textual list that can automatically change as changes in the user's computer activities provoke look-up results containing different callees.

Advantages

Those of skill in the art will recognize that there are numerous advantages to various embodiments of the disclosed invention. For example, users of the invention can potentially enjoy tremendous productivity, quality, and/or safety gains based on the anticipation of their likely activities based on an incoming call. Other parties to a call can also potentially benefit from these gains.

Also, users of the invention can potentially enjoy tremendous productivity, quality, and/or safety gains based on the anticipation of their likely calls based on their recent activities. For instance, by having the ability to place a marginally desired call without the need to look-up the callee's telephone number, embodiments of the present invention increase the likelihood that the call will be placed, and thereby increase the chance that useful communications between the user and the callee will occur.

Still other advantages of the present invention will become readily apparent to those skilled in this art from the above-recited detailed description. Accordingly, the drawings and descriptions are to be regarded as illustrative in nature, and not as restrictive.

What is claimed is:

1. A method for facilitating a call related to a computer activity, comprising:
   identifying a first occurrence of a computer activity involving a user;
   identifying a first occurrence of a call activity associated with a call identifier and involving the user;
   associating the computer activity with the call activity;
   recognizing a second performance of the computer activity involving the user;
   anticipating a second occurrence of the call activity based on the second performance of the computer activity;
   providing, via a user-computer interface, a call activity trigger associated with the anticipated call activity; and
   placing, for the user, a call having the call identifier in response to a selection of the call activity trigger.

2. The method of claim 1, wherein the call activity includes directing a call to a user.

3. The method of claim 1, wherein the call activity includes transmitting a call.

4. The method of claim 1, wherein the call activity includes placing a call.

5. The method of claim 1, wherein the call activity includes directing a call from a user.

6. The method of claim 1, wherein the call identifier is a caller's name.

7. The method of claim 1, wherein the call identifier is a calling number.

8. The method of claim 1, wherein the call identifier is an ANI.

9. The method of claim 1, wherein the call identifier is a callee's name.

10. The method of claim 1, wherein the call identifier is a called number.

11. The method of claim 1, wherein the call identifier is an a DNIS.

12. The method of claim 1, further comprising obtaining information regarding the call activity.

13. The method of claim 1, further comprising obtaining information regarding the user activity.

14. The method of claim 1, further comprising storing information regarding the call activity.

15. The method of claim 1, further comprising storing information regarding the user activity.

16. The method of claim 1, further comprising analyzing information regarding the call activity.

17. The method of claim 1, further comprising analyzing information regarding the user activity.

18. The method of claim 1, further comprising statistically analyzing information regarding the call activity.

19. The method of claim 1, further comprising statistically analyzing information regarding the user activity.

20. The method of claim 1, further comprising relating the user activity to the call activity.

21. The method of claim 1, further comprising creating the user activity trigger.

22. The method of claim 1, further comprising associating the user activity trigger with the call identifier.

23. The method of claim 1, further comprising formating the user activity menu item.

24. The method of claim 1, further comprising rendering the user activity trigger.

25. The method of claim 1, further comprising detecting selection of the user activity trigger.

26. The method of claim 1, wherein the user activity trigger includes a menu item.

27. The method of claim 1, wherein the user activity trigger includes a button.

28. The method of claim 1, wherein the user activity trigger includes a link.

29. The method of claim 1, wherein the user activity trigger includes a macro.

30. A computer-readable medium storing instructions for activities comprising:
   identifying a first occurrence computer activity engaged in by a user;
   identifying a first occurrence of a call activity associated with a call identifier and involving the user;
   associating the computer activity with the call activity;
   recognizing a second performance of the computer activity engaged in by the user;
   anticipating a second occurrence of the call activity based on the second performance of the computer activity;
   providing, via a user-computer interface, a call activity trigger associated with the anticipated call activity; and
   placing, for the user, a call having the call identifier in response to a selection of the call activity trigger.

31. An apparatus for facilitating a call related to a computer activity, comprising:
- means for identifying a first occurrence computer activity involving a user;
- means for identifying a first occurrence of a call activity associated with a call identifier and involving the user;
- means for associating the computer activity with the call activity;
- means for recognizing a second performance of the computer activity involving the user;
- means for anticipating a second occurrence of the call activity based on the second performance of the computer activity;
- means for providing, via a user-computer interface, a call activity trigger associated with the anticipated call activity; and
- means for placing, for the user, a call having the call identifier in response to a selection of the call activity trigger.

* * * * *